United States Patent [19]

Holter et al.

[11] Patent Number: 4,832,936
[45] Date of Patent: May 23, 1989

[54] PROCESS FOR MAKING CALCIUM SULFATE DIHYDRATE OR GYPSUM

[75] Inventors: Heinz Holter, Beisenstrasse 39-41, D-4390 Gladbeck; Georg Gebhard, Essen, both of Fed. Rep. of Germany

[73] Assignee: Heinz Holter, Gladbeck, Fed. Rep. of Germany

[21] Appl. No.: 99,416

[22] Filed: Sep. 21, 1987

[30] Foreign Application Priority Data

Sep. 20, 1986 [DE] Fed. Rep. of Germany ....... 3632032

[51] Int. Cl.$^4$ .................... C01B 17/00; C01F 11/46
[52] U.S. Cl. ........................................ 423/555; 423/242
[58] Field of Search ............................... 423/555, 242

[56] References Cited

U.S. PATENT DOCUMENTS

| | | |
|---|---|---|
| 3,873,532 | 3/1975 | Dahlstrom et al. ............ 423/242 A |
| 3,972,980 | 8/1976 | Lowell ............................. 423/242 A |
| 4,301,127 | 11/1981 | Goodstine et al. ............. 423/242 A |
| 4,374,812 | 2/1983 | Atsukawa et al. ............. 423/242 A |
| 4,410,500 | 10/1983 | Wang et al. .................... 423/242 A |
| 4,487,784 | 12/1984 | Kuroda et al. ................. 423/242 A |
| 4,587,112 | 5/1986 | Kim ................................ 423/555 |
| 4,618,482 | 10/1986 | Shinddu et al. ................ 423/242 A |
| 4,687,649 | 8/1987 | Kuroda et al. ................. 423/242 |
| 4,696,804 | 9/1987 | Shinoda et al. ................ 423/555 |

*Primary Examiner*—Gary P. Straub
*Attorney, Agent, or Firm*—Herbert Dubno

[57] ABSTRACT

A process is described for making flue gas gypsum from desulfurization of power plant exhaust gas. The process comprises treating the flue gas in a wash tower with a wash water suspension containing calcium oxide, calcium hydroxide or calcium carbonate and converting the scrubbed sulfur dioxide by oxidation with input atmospheric oxygen and by crystallization to calcium sulfate dihydrate crystals. A cyclic flow is drawn from the wash tower sump and delivered by spray nozzles to the wash tower. Further the process comprises continuously drawing an additional crystal suspension from the wash tower sump which after separation of a crystal slurry is partly fed back to the wash tower sump. The lower run-off of a cyclone separator receiving the crystal suspension is dewatered, the flue gas gypsum is separated and a clear effluent is returned to the wash tower. A partial flow is separated from the upper run-off of the cyclone separator and a solid free fluid replaces it. By control of the amount of the partial flow separated from the upper run-off the grain size of the removed gypsum or calcium sulfate dihydrate crystals is precisely adjusted and the proportion of finely divided solids in the wash tower sump is adjusted so that at least 10 weight %, advantageously 20 to 70 weight %, of the solid material contained in the crystal slurry remains in the upper run-off of the cyclone separator.

8 Claims, 3 Drawing Sheets

PROCESS FOR MAKING CALCIUM SULFATE DIHYDRATE OR GYPSUM

FIELD OF THE INVENTION

My present invention relates to a process for making flue gas gypsum in a step in the desulfurization of power plant exhaust gas.

BACKGROUND OF THE INVENTION

Flue gas gypsum is made in the flue gas desulfurization of power plant exhaust gas. The method comprises treating the flue gas in a scrubbing tower with a scrubbing water suspension containing calcium oxide, calcium hydroxide or calcium carbonate. Scrubbed sulfur dioxide is then converted by oxidation with atmospheric oxygen fed to the system and by crystallization to calcium sulfate dihydrate crystals. A recycle flow is drawn from the scrubbing tower sump and is delivered by spray nozzles to the scrubbing tower.

Furthermore an additional crystal suspension stream is continuously drawn from the scrubbing tower sump. The drawn stream is split by a cyclone separator into a lower run-off resulting in a crystal slurry and an upper run off or decantate fed again to the scrubbing tower sump and having a finely divided solid component. The lower run off is dewatered, flue gas gypsum separated and the clear effluent is returned to the scrubbing tower.

In this process the scrubbing tower sump pH value is adjusted to a pH of 4 to 6. The delivery of calcium oxide, calcium hydroxide or calcium carbonate can occur at different locations in this process. Thus, as described in VGB Kraftswerkstechnik 63 (1983) No. 4, pages 335 to 344, a slurry of limestone (calcium carbonate) is fed to the upper portion of the scrubbing tower while calcium hydroxide in an aqueous suspension (milk of lime) is delivered to the scrubbing tower sump. Advantageously the flue gas is scrubbed in a counterflow. The flue gas can be fed in a continuous flow to the sprayed scrubbing water suspension.

In the known process only the solid content is constantly adjusted in the scrubbing tower sump since the crystal suspension is withdrawn by pump continuously or periodically from the scrubbing tower sump and scrubbed or purified. The separated fluid is fed to the scrubbing tower. The proportion of fine crystals present is extremely small and is approximately 1 weight % in that size range.

The flue gas gypsum made according to this known process is large grained and can be dewatered with a residual moisture content of about 6 to 7 weight %. Grain size of the flue gas gypsum so made is larger than the grain size spectrum of flue dust or fly ash.

Both the grain distribution and the water binding capacity are controllable only to a small extent. The large grain size and the small crystal surface area are disadvantageous in making disposable mixtures with flue dust or fly ash. Particularly, the solidification characteristics is unsatisfactory of a mixture of flue gas, gypsum and scrubbing water suspension components.

OBJECTS OF THE INVENTION

It is an object of my invention to provide an improved process for making calcium sulfate dihydrate or gypsum which overcomes these drawbacks.

It is also an object of my invention to provide an improved process for making calcium sulfate or gypsum useable in the production of a flue gas gypsum having a finer grain size and a larger grain surface area.

It is another object of my invention to provide an improved process for making calcium sulfate or gypsum in which the grain size of the flue gas gypsum product can be precisely controlled.

SUMMARY OF THE INVENTION

These objects and others which will become more readily apparent hereinafter are attained in accordance with my invention in a process for making flue gas gypsum through desulfurization of a fossil-fuel power plant fuel gas. First the flue gas is treated in a scrubbing tower with a scrubbing water suspension containing calcium oxide, calcium hydroxide or calcium carbonate. Scrubbed sulfur dioxide is then converted by oxidation with input atmospheric oxygen and by crystallization to calcium sulfate dihydrate crystals. A recycle stream is drawn from the scrubbing tower sump and is delivered by spray nozzles to the scrubbing tower. Furthermore, an additional crystal suspension stream is continuously drawn from the scrubbing tower sump and is split by a cyclone separator into a lower run-off resulting in a crystal slurry and an upper run-off fed again to the scrubbing tower sump having a finely divided solid component. The lower run-off is dewatered, flue gas gypsum separated and the clear effluent is returned to the scrubbing tower.

According to my invention at least 10 weight % of the solid material contained in the crystal slurry has a grain diameter of less than 20 micrometers and is carried along in the upper run-off of the cyclone separator. A partial flow is drawn off from the upper run-off and is replaced by a solid-free fluid. By control of the amount of the partial flow the grain size is adjusted of the drawn off calcium sulfate dihydrate crystal product or the gypsum.

By throttling the amount of the the partial flow, fine calcium sulfate dihydrate crystals are produced and by increasing the reate of the partial flow larger (coarser) calcium sulfate dihydrate crystals are produced.

Surprisingly it is possible using the process of my invention to adjust very precisely the grain size of the calcium sulfate dihydrate crystals separated from the scrubbing water suspension when a crystal suspension containing more or less solid is supplied by changing the partial flow from the upper run-off.

My invention is based upon the discovery that the prevailing seed formation mechanism is secondary seed formation and the seed formation speed, i.e. the number of newly formed seeds per unit time, is effected by the frequency and intensity of the collisions of the crystals in the suspension. Only by controlling the amount of the partial flow, the seed formation speed controlling the process can be both strengthened and weakened.

The numerical correlation between the grain size of the flue gas gypsum and the fine solid composition in the scrubbing water suspension is dependent on other factors such as the foreign salts present, the flow conditions and the like and thus certain plant variables which can be easily determined by experiment.

In accordance with the invention, 20 to 70 weight% of the solid components in the crystal suspension can be carried in the run-off from the cyclone separator. When the grain size spectrum has a considerable amount of fine component in the scrubbing water suspension, as is the case in my process, it is surprisingly possible to be able to completely control the crystallization. The fine component of the solid material contained in the scrubbing tower sump is so small that it can not be separated out by the cyclone separator.

Solids carried along in the partial flow can be separated out and the derivative effluent fed back into the scrubbing tower. Thus, the partial flow which is not fed back into the scrubbing tower sump can remain in circulation and processed in such a way that it itself has no effect on the course of the process. It is also possible in my process to effect the crystal yield by dissolved components in the scrubbing water suspension. Thus the possibilities for controlling the crystallization are expanded further.

The invention also includes a process wherein the partial flow is discontinuously drawn. A pause interval and a delivery interval are provided and the amount of flow can be controlled by adjusting the length of the pause interval. Thus control of performance of the process is optimized.

Also according to my invention the calcium oxide, calcium hydroxide or calcium carbonate delivered to the scrubbing tower can be mixed with a portion of the run-off of the cyclone separator fed back to the scrubbing tower. The entire water balance of the process must be considered. It is also possible in a process according to my invention to feed finely divided silicate components to the scrubbing tower sump. Basic clay silicate fine components are especially suitable. The input of silicate fine components, e.g. Kaolin, then can be significant when new operating conditions must be set. The secondary seed formation is controlled by delivery of additional fine solid materials and the adjustment to the new stationary state is speeded.

The flue gas gypsum leaving the cyclone separator can be dewatered and pressed to a molded body. Experiments have shown that a compression strength of up to 5 N/mm$^2$ can be attained so that the molded body can be used for a variety of purposes.

Finally the dewatered flue gas gypsum can be drawn away as a fine grained gypsum suitable as a filler. Additional processing steps are advantageously eliminated so that there is obtained an economical manufacture of gypsum used, for example, as a filler material in paper. It has thus been shown that an advantageous widely usable gypsum results. Even in the worst case, the gypsum can be stored alone or together with fly ash.

The flue gas gypsum made according to my invention has a very fine grain size with correspondingly large surface area and is surprisingly porous. Indeed the flue gas gypsum made of the process according to my invention clearly differs in its crystalline form from the known products.

The flue gas gypsum according to my invention is flake like, and in no case are the crystals coarse grained, lamella-form or needle-like as is the gypsum which has been previously made. Residual moisture of the mechanically dewatered flue gas gypsum amounts to about 30% according to the process of my invention and is thus substantially greater than previous results.

Additional advantages are present as well. The grain size with larger surface area causes a high solidification of mixtures of fly ash, gypsum and water from the flue gas desulfurization as a result of the wedge filling.

An extraordinarily large reactivity in a chemical transformation with components of flue gas results because of the large surface area. This large reactivity ensures reduced extraction or leaching-out.

As a result the flue gas gypsum made in the process according to my invention has a exceptional storability. The binding with salts and metals is clearly larger than with flue gas gypsum made in previous processes available prior to my invention. Also the breaking strength is higher. Further, in comparison to flue gas gypsum which is made by the previously known processes, my gypsum/fly ash mixture can have additional types of uses because of the special product properties. A waste water free manufacturing process is also possible because of the better water capacity of my gypsum.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
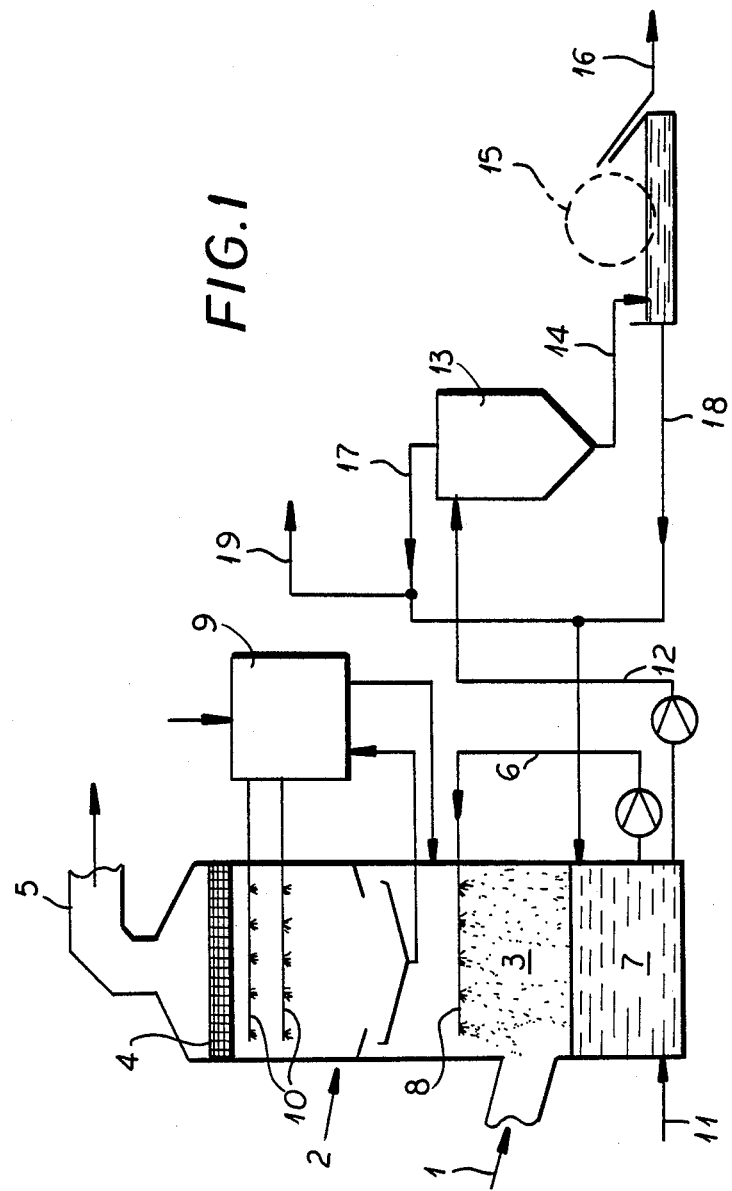
FIG. 1 is a flow chart of one example of a process for making flue gas gypsum comprising calcium sulfate dihydrate from power plant exhaust gas. Also the essential components of a plant for performing that process are shown.

The flow charts of the drawing illustrates a process and plant for making gypsum in a single step in the desulfurization of power plant exhaust gas.

Flue gas 1 is fed to a scrubbing tower 2 and treated in a counterflow with a scrubbing water suspension and containing calcium oxide, calcium hydroxide or calcium carbonate. The sulfur dioxide contained in the flue gas is scrubbed. Flue gas freed of $SO_2$ traverses a droplet separator 4 and then leaves the scrubbing tower at exit 5.

The scrubbing water suspension is drawn from the scrubbing tower sump 7 in a first recycle stream 6 and is delivered to the scrubbing tower 2 by spray nozzles 8. In the example, limestone (calcium carbonate) is delivered essentially as an aqueous suspension 9 by the nozzles 10 which are located in the upper portion of the scrubbing tower 2.

In the scope of the process according to my invention, suspension 9 of calcium oxide, calcium hydroxide or calcium carbonate can be fed directly to the scrubbing tower sump 7. In one such case the scrubbing water suspension is fed into the scrubbing tower 2 in different stages (levels) which extend over the entire height of the scrubbing tower.

The pH value of the scrubbing tower sump 7 is adjusted from 4 to 6. Furthermore, atmospheric oxygen 11 is fed to the scrubbing tower sump 7. The sulfur dioxide being produced in the scrubbing tower sump 7 is converted by oxidation and by crystallization into calcium sulfate dihydrate crystals.

A crystal suspension 12 is drawn from the scrubbing tower sump 7 and is fed to a cyclone separator 13. In the cyclone separator 13, calcium sulfate dihydrate crystals which are larger than the separating grain size associated with the cyclone separator 13 separate out and form a crystal slurry in a lower run-off 14 of the cyclone separator 13. In this example the cyclone separator 13 is operated with a separating grain diameter from about 10 to 20 micrometers. Solid particles which correspond to this grain size by definition reach the lower run-off 14 and the upper run-off 17 in equal amounts. The crystal slurry is mechanically dewatered in a downstream concentrator 15, e.g. a vacuum drum filter, and taken off as flue gas gypsum. The upper run-off 17 of the cyclone separator 13 and the clear effluent 18 produced by the mechanical dewatering of the crystal slurry are fed back to the scrubbing tower sump 7.

the amount of the fine components in the scrubbing tower sump 7 is adjusted so that at least 10 weight %, advantageously 20 to 70 weight %, of the solid material remains in the upper run-off 17 of the cyclone separator 13. It is fed back to the scrubbing tower sump 7 substantially as crystal seeds. The concentration of the solid components in the scrubbing tower sump 7 influences the grain size of the flue gas gypsum made in the process. A large number of crystal seeds stimulates a second seed formation in the scrubbing water suspension and leads to a more fine grained flue gas gypsum product.

Accordingly the flue gas gypsum product is larger grained when the second seed formation is reduced since the number of the crystal seeds in the scrubbing water suspension is reduced. The grain size of the flue gas gypsum is precisely controlled with the help of a suspension-controlling partial flow 19 from the upper run-off 17 of the cyclone separator. The amount of the suspension-controlling partial flow 19 is adjusted according to the desired grain size of the flue gas gypsum product 16. For correcting too fine a flue gas gypsum product, the separate quantites are metered to increase the grain size of the product. In steady state operation a waste water free process is possible. Advantageously according to one example of the invention the suspension-controlling partial flow 19 is discontinuously drawn off and the amount controlled by adjustment of the time intervals.

Figure 2:
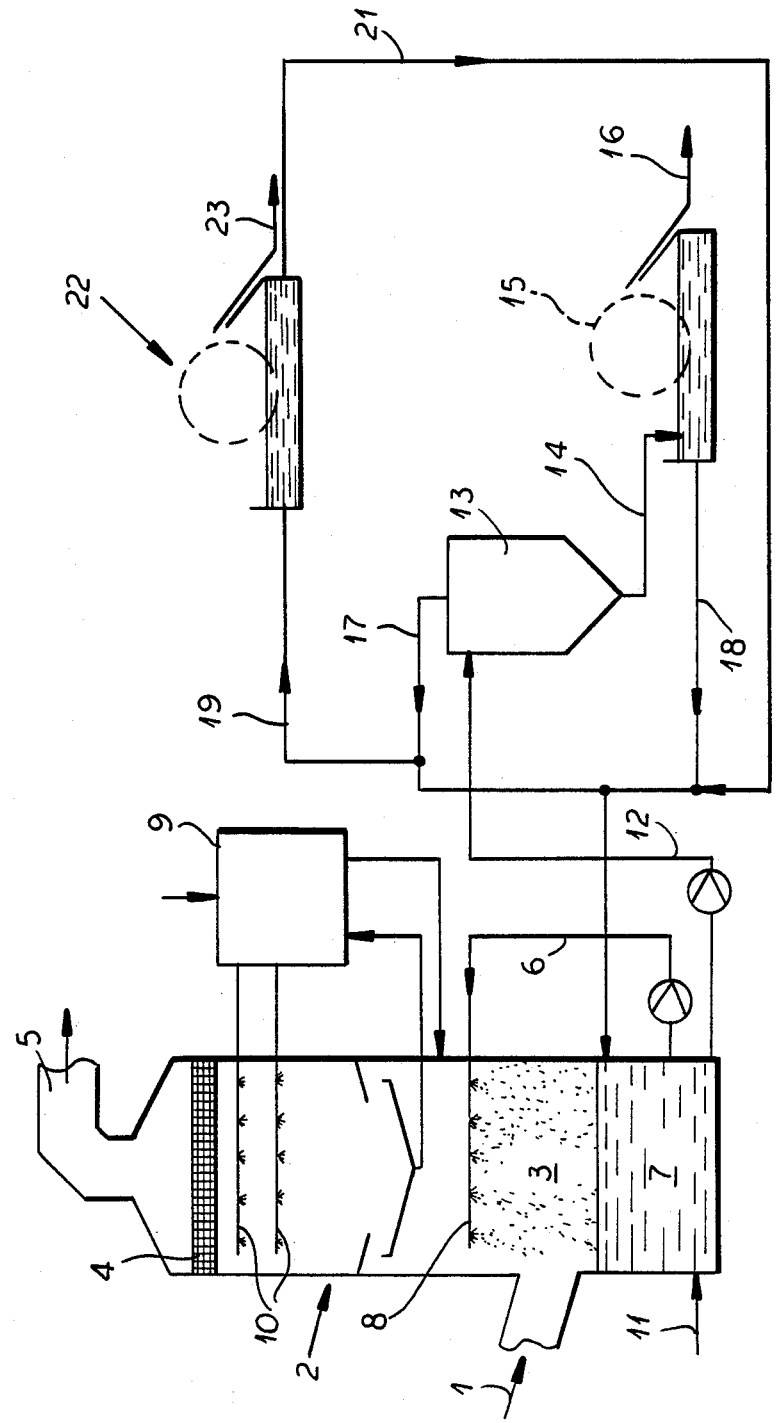
FIG. 2 is a flow chart of another example of a process for making flue gas gypsum comprising calcium sulfate dihydrate from power plant exhaust gas.

In an additional example of my process which has been illustrated in FIG. 2 the suspension-controlling partial flow 19 separated from the upper run-off 17 is concentrated and the drawn off derivative flow 21 is fed back to the scrubbing water sump 7. It is also possible to influence the composition of the dissolved components in the scrubbing water suspension.

Also in a second example of my invention shown in FIG. 2 the calcium oxide, calcium hydroxide or calcium carbonate 9 delivered to the scrubbing tower 2 is mixed with a partial flow 19' from the upper run-off 7. In other ways this example is the same as the example of FIG. 1.

An additional feature also not shown in the drawing is that finely divided silicate, especially clay, can be fed to the scrubbing tower sump 7. A new steady state is speeded because of that adjustment.

Figure 3:
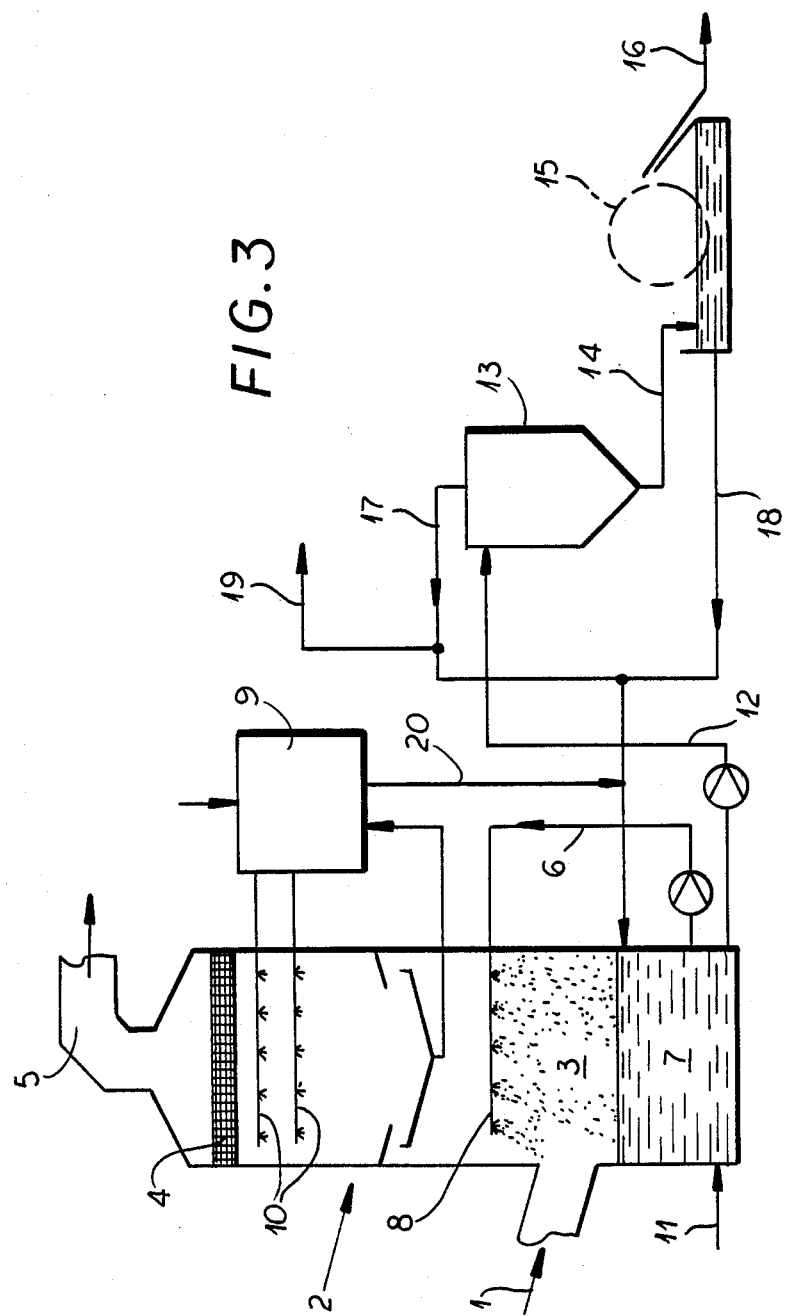
FIG. 3 is a flow chart of an additional example of a process for making flue gas gypsum comprising calcium sulfate dihydrate from power plant exhaust gas.

FIG. 3 shows another embodiment according to my invention. The calcium oxide, calcium hydroxide or calcium carbonate 9 delivered to the scrubbing tower 2 is mixed with a portion of the upper run-off 17 of the cyclone separator 13 fed back to the scrubbing tower 2. Otherwise this embodiment is identical to that of FIG. 1.

I claim:

1. A process for making flue gas gypsum in a step in the flue gas desulfurization of power plant exhaust gas comprising:

(a) treating said flue gas in a scrubbing tower with a scrubbing water suspension containing calcium oxide, calcium hydroxide or calcium carbonate;

(b) converting the scrubbed sulfur dioxide in said flue gas by oxidation with input atmospheric oxygen and by crystallization to calcium sulfate dihydrate crystals;

(c) drawing a recycle crystal suspension stream from the scrubbing tower sump;

(d) delivering said recycle crystal suspension stream by a plurality of spray nozzles to said scrubbing tower;

(e) further continuously drawing an additional crystal suspension holding solid materials from said scrubbing tower sump;

(f) splitting said additional crystal suspension flow by a cyclone separator into a lower run-off resulting in a crystal slurry and an upper run-off at least partly fed again to said scrubbing tower sump, said upper run-off retaining at least 10 weight % of said solid material contained in said additional crystal suspension which material has a grain diameter of less than 20 micrometers;

(g) delivering a clay powder to said scrubbing tower sump to control grain size growth;

(h) dewatering said lower run-off;

(i) separating said flue gas gypsum from said lower run-off after dewatering;

(j) returning a clear effluent resulting from dewatering said lower run-off to said scrubbing tower; and (k) drawing off a partial flow from said upper run-off, replacing said partial flow by a solid-free fluid and adjusting the amount of said partial flow so that said grain size of the drawn off calcium sulfate dihydrate crystal product or said gypsum is controlled so that by increasing said amount of said partial flow larger calcium sulfate dihydrate crystals are produced.

2. The process according to claim 1 wherein 20 to 70 weight % of said solid material in said additional crystal suspension is carried away in said upper run-off of said cyclone separator.

3. The process according to claim 1 wherein said solid material carried along in said partial flow is separated therefrom and the derivative effluent so formed is fed back to said scrubbing tower.

4. The process according to claim 1 wherein said partial flow is drawn off discontinuously, the time interval in which said partial flow is drawn off and the pause interval in which said partial flow is temporarily not drawn off being variable and the amount of flow being controlled in a time manner by adjustment of said pause interval.

5. The process according to claim 1 wherein said calcium oxide, said calcium hydroxide or said calcium carbonate delivered to said scrubbing tower is mixed with a portion of said upper run-off of said cyclone separator fed back to said scrubbing tower.

6. The improvement according to claim 1 wherein said clay powder is a kaolin clay.

7. The process according to claim 1 wherein said gypsum which has been dewatered is pressed to form a molded body.

8. The process according to claim 1 wherein said gypsum which has been dewatered is drawn off as a gypsum suitable for a filler material.

* * * * *